United States Patent
Ramamurthy et al.

(10) Patent No.: US 11,704,855 B2
(45) Date of Patent: *Jul. 18, 2023

(54) CUSTOMIZABLE ANIMATION EXPERIENCE

(71) Applicant: salesforce.com, inc., San Francisco, CA (US)

(72) Inventors: Pavithra Ramamurthy, Foster City, CA (US); Kirupa Chinnathambi, Redmond, WA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,662

(22) Filed: Jan. 22, 2020

(65) Prior Publication Data
US 2021/0225059 A1    Jul. 22, 2021

(51) Int. Cl.
*G06T 13/80* (2011.01)
*G06F 8/30* (2018.01)
*G06F 9/451* (2018.01)

(52) U.S. Cl.
CPC .............. *G06T 13/80* (2013.01); *G06F 8/315* (2013.01); *G06F 9/453* (2018.02); *G06T 2213/08* (2013.01)

(58) Field of Classification Search
None
See application file for complete search history.

(56) References Cited

U.S. PATENT DOCUMENTS

| 8,164,596 B1* | 4/2012 | Bech ................. G06T 13/00 345/475 |
| 2012/0284625 A1* | 11/2012 | Kalish ............... G11B 27/034 715/723 |
| 2013/0141427 A1* | 6/2013 | Lucas ................ G06T 13/20 345/419 |
| 2018/0364303 A1* | 12/2018 | Werhane ............. H03K 5/133 |
| 2018/0365303 A1* | 12/2018 | Prophete ........... G06F 16/2455 |

* cited by examiner

*Primary Examiner* — Jeffrey J Chow
(74) *Attorney, Agent, or Firm* — Sterne, Kessler, Goldstein & Fox P.L.L.C.

(57) ABSTRACT

Disclosed herein are system, method, and device embodiments for implementing a customizable animation experience. A multi-tenant service may associate an animation element with a visual component of an application, and generate a markup component including an animation parameter configured to customize the animation element within the application code. Further, the multi-tenant service may receive a request for the animation from an animation manager based on execution of the application code, and send the animation information to the animation manager. In some embodiments, the animation manager is configured to set the animation parameter to the animation information and present an animation associated with the animation element based on the animation parameter.

17 Claims, 5 Drawing Sheets

CUSTOMIZABLE ANIMATION EXPERIENCE

BACKGROUND

A service provider may offer a multi-tenant declarative programming platform that provides resources for declaratively programming applications via functional user interface components. In some instances, developers using the platform to build applications may endeavor to present animations in connection with the user interface components. However, many animation implementations prevent user customization and post-development updates.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for implementing customizable animations in a multi-tenant system.

Figure 1:
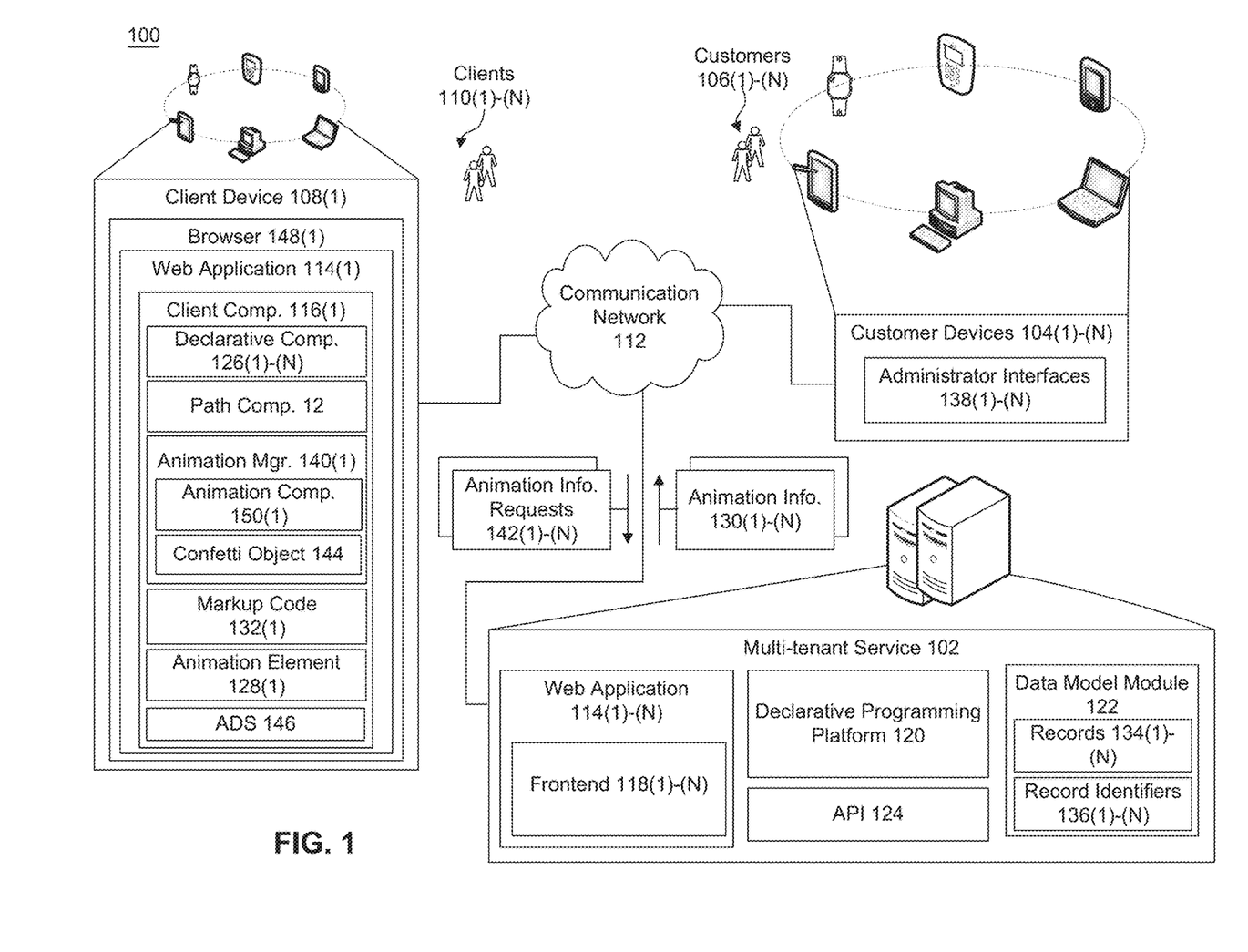
FIG. 1 is a block diagram of an example framework for implementing a customizable animation experience in a multi-tenant system, according to some embodiments.

FIG. 1 illustrates a block diagram of an example framework for implementing a customizable animation experience, according to embodiments of the present disclosure. As illustrated in FIG. 1, a multi-tenant system 100 may include a multi-tenant service 102, a plurality of customer devices 104(1)-(N) associated with a plurality of customers 106(1)-(N), and a plurality of client devices 108(1)-(N) associated with a plurality of clients 110(1)-(N).

In some embodiments, the first customer device 104(1) is associated with the first customer 106(1), the second customer device 104(2) is associated with the second customer 106(2), the Nth customer device 104(N) is associated with the Nth customer 106(N), and so forth. Further, in some embodiments, the first client device 108(1) may be associated with the first client 110(1), the second client device 108(1) may be associated with the second client 110(2), the Nth client device 108(N) may be associated with the Nth client 110(N), and so forth.

Additionally, the multi-tenant service 102, the customer devices 104(1)-(N), and the client devices 108(1)-(N) may communicate via a communication network(s) 112. The communication network(s) 112 may include any or all of a private network, personal area network (PAN), Local-Area Network (LAN), Wide-Area Network (WAN), or the Internet. Further, the connection between the multi-tenant service 102, the customer devices 104(1)-(N), or the client devices 108(1)-(N), and the communication network(s) 112 may be a wireless connection (e.g., Bluetooth, Wi-Fi connection, etc.), or a wired connection (e.g., Ethernet, universal serial bus (USB), etc.), or a combination thereof.

In some embodiments, the multi-tenant service 102 may provide a multi-tenant cloud computing solution to the customers 106(1)-(N). In particular, various elements of hardware and software of the multi-tenant service 102 may be shared by the customers 106(1)-(N). In some embodiments, the data and services provided by the multi-tenant service 102 to individual customers 106 may be securely isolated from the data and services provided to other customers 106. Additionally, or alternatively, in some embodiments, multiple customers 106 may share access to common data and services.

As an example, the customers 106(1)-(N) may provide web applications 114(1)-(N) to the client devices 108(1)-(N) via the multi-tenant service 102. For instance, the first customer 106(1) may design or operate the first web application 114(1) via the multi-tenant service 102, the second customer 106(2) may design or operate the second web application 114(2) via the multi-tenant service 102, and the Nth customer 106(N) may design or operate the Nth web application 114(N) via the multi-tenant service 102. Further, the multi-tenant service 102 may serve the web applications 114(1)-(N) to the client devices 108(1)-(N) via the communication network 112. Additionally, the client devices 108(1)-(N) may send requests associated with the web applications 114(1)-(N) to the multi-tenant service 102 via the communication network 112, and the multi-tenant service 102(N) may process the requests and send responses to the client devices 108(1)-(N) via the communication network 112.

In some embodiments, each web application 114 may include a client component 116 and a front-end component 118. Further, the client component 116 may be executed at least partially on a client device 108, and the front-end component 118 may be at least partially executed by the multi-tenant service 102. In addition, the front-end component 118 may be configured to receive requests from the client component 116, and send responses to the client component 116.

For example, the customer 106(1) may develop and operate the web application 114(1). Further, the web application 114(1) may include the client component 116(1) and the front-end component 118(1). Additionally, one or more clients 110 may use the client component 116(1) on their client devices 108. The client component 116(1) may cause the client devices 108 corresponding to the one or more clients 110 to send data to the front-end component 118(1), and receive data from the front-end component 118(1).

As illustrated in FIG. 1, the multi-tenant service 102 may include a declarative programming platform 120, a data model module 122, an application programming interface (API) 124, and the front-end applications 116(1)-(N). The declarative programming platform 120 may be a user interface framework employed by the customers 106(1)-(N) to declaratively program the web applications 114(1)-(N). As used herein, and in some embodiments, "declarative programming" may refer to software development via point and click, drag and drop interfaces, configuration wizards, and/ or declarative language input (eXtensible Markup Language (XML), YAML Ain't Markup Language (YAML), Extensible Application Markup Language (XAML), or any other markup languages) to text input forms.

The declarative programming platform 120 may include declarative components 126(1)-(N) that may be added to the web applications 114(1)-(N). For example, the declarative component 126(1) may be added to the web application 114(1). As used herein, in some embodiments, a "declarative component" may refer to a reusable programming unit used to provide a feature or function to an application. In some embodiments, the declarative components 126(1)-(N) may be custom hypertext markup language (HTML) elements built using HTML, CSS, and JavaScript.

Additionally, the declarative programming platform 120 may include animation elements 128(1)-(N) that may be added to the web applications 114(1)-(N). As used herein, in some embodiments, an "animation element" may refer to a reusable programming unit used to provide an animation within an application. Further, the customers 106(1)-(N) may employ the declarative programming platform 120 to provide animation information 130(1)-(N) used to dynamically customize the animation corresponding to the animation elements 128(1)-(N). For example, the customer 106(1) may provide the animation information 130(1) for dynamically configuring the animation element 128(1) of the web application 114(1) via the declarative programming platform 120. The animation information 130(1)-(N) may include values for elements, attributes, and properties associated with the animation elements 128(1)-(N). In some embodiments, the animation information 130(1)-(N) may include key-value pairs that each map an element, attribute, or property to a value. In some embodiments, the multi-tenant service provider may restrict the attributes that may be customized to maintain uniformity among the tenants or promote usability across the web applications 114(1)-(N).

For instance, the animation element 128(1) may represent a confetti animation that presents digital graphics simulating balloons and confetti (i.e., pieces or streamers of paper, mylar, or metallic material) moving according to a pattern. The animation information 130(1) may include the attribute values used to implement the animation element 128(1) within the web application 114(1). In some embodiments, the animation information 130(1) may include values defining the shapes, color, style, and size of graphical objects presented within the animation. In some other embodiments, the animation information 130(1) may also define the type of an animation, an animation pattern, an animation speed, an animation duration, an animation direction, an animation effect, an animation color scheme, an image in the animation, or an audio file played during the animation.

As an example, the animation information 130(1) may describe the size of the confetti, the shapes of the confetti, or one or more colors applied to the individual pieces of confetti. As another example, the animation information 130(1) may describe a logo or object to be formed by the confetti during the animation, the speed at which the confetti or balloons move during the animation, a direction by which the confetti or balloons move during the animation, or a pattern formed by the simulated pieces of paper. For instance, the animation element 128(1) may be a confetti animation that simulates falling pieces of confetti that combine to form a logo or object (e.g., a heart) set forth in the animation information 130(1). In yet still another example, the animation information 130(1) may include an audio file, and the audio file may be reproduced during the confetti animation to provide an audio effect.

In some embodiments, the animation information 130(1) may include different attribute values for different types of devices and/or users. For instance, the animation information 130(1) may include a first attribute value for devices having a first form factor, and a second attribute value for devices having a second form factor. As an example, the animation information 130(1) may configure the animation to present the confetti at a first size based upon the screen size of a first device being less than a predetermined screen size, and configure the animation to present the confetti at a second size based upon the screen size of the second device being greater than a predetermined screen size.

In some embodiments, an animation element 128 may be associated with a particular declarative component 126 within a web application 114. For instance, the animation element 128(1) may be configured to present its corresponding animation in response to user interaction with the declarative component 126(1). Further, the declarative programming platform 120 may include a configuration wizard for adding the declarative component 126(1) and/or the animation element 128(1) to the web application 114(1), and associating the animation element 128(1) with the declarative component 126(1) within the web application 114(1).

As an example, the customer 106(1) may employ a configuration wizard for adding a path component 131 to the web application 114(1). Further, the customer 106(1) may configure, via the configuration wizard, the web application 114(1) to present a celebration animation represented by animation element 128(1) in response to completion of a path stage of the path component 131. The celebration animation may display on-screen virtual confetti (or other graphic or animation) in response to a user performing a designated behavior (e.g., completion of the path stage of the path component 131). Further, the celebration animation may drive user engagement and be employed by the customer 106(1) to positively reinforce performance of the designated behavior by the clients 110. As used herein, and in some embodiments, a "path component" may refer to a declarative component for displaying the progress of a process. The path component 131 may be rendered within the web application 114(1) as a horizontal bar with a chevron for each picklist item. As used herein, and in some embodiments, a "path stage" may refer to a step within a process represented by a path component. In some embodiments, a path stage may correspond to a picklist item in the picklist field that has been selected to build the path component.

Further, the customer 106(1) may employ the configuration wizard to customize the animation element 128(1) associated with the path component 131. In some embodiments, the configuration wizard may present a GUI for setting the animation information 130(1) for the animation element 128(1) corresponding to the path component 131. As an example, the configuration wizard may include GUI controls for selecting a size, a shape, a color scheme, or a design style of the confetti. As another example, the configuration wizard may include GUI controls for selecting a speed at which the confetti or balloons move during the animation, selecting a direction by which the confetti or balloons move during the animation, or selecting a pattern formed by the simulated pieces of paper. Additionally, the configuration wizard may include a GUI control for selecting a logo formed by the confetti during a confetti animation.

The multi-tenant service 102 may serve the web applications 114(1)-(N) to the client devices 108(1)-(N). The data model module 122 may store information associated with the multi-tenant system 100. For example, the data model module 122 may store application code, configuration information, and related data (e.g., media files) associated with the web applications 114(1)-(N). As an example, the customer 106(1) may design and develop the web application 114(1) using the declarative component 126(1) and the animation element 128(1) of the declarative programming platform 120. Further, the declarative programming platform 120 may generate application code (e.g., configuration code) or configuration information (e.g., animation information 130(1)) corresponding to the web application 114(1) during the development process, and store the application code or configuration information in the data model module 122. In some embodiments, the application code or configuration information may include XML code, HTML code, cascading style sheets (CSS) code, or JavaScript code corresponding to the declarative component 126(1), the animation element 128(1), the animation information 130(1), or the path component 131.

For instance, the declarative programming platform 120 may generate application code and/or configuration information that presents a celebration animation upon completion of a path stage of the path component 127 of the website application 114(1). In some embodiments, the declarative programming platform 120 generates the application code and/or configuration information based upon the addition of the declarative component 126(1) and the animation element 128(1) to the web application 114(1). For example, as described in detail herein, the declarative programming platform 120 may generate the markup code 132(1) associated with the declarative component 126(1) and the animation element 128(1) within the application code of the web application 114(1).

In some embodiments, the markup code 132(1) may be parameterized markup code, and the animation information 130(1) may be input into the markup code 132(1) to dynamically customize the animation element 128(1) within the web application 114(1). For instance, the markup code 132(1) may include parameters representing the size, the shape, the color scheme, or the design style of graphical objects displayed within the animation corresponding to the animation element 128(1), and the animation information 130(1) may be assigned to the parameters within the markup code 132(1).

As used herein, in some embodiments, "parameterized markup" may refer to markup code wherein at least one of an element or an attribute is a parameter or assigned to a parameter. Further, the declarative programming platform 120 may generate application code implementing the animation corresponding to the animation element 128(1). For instance, the declarative programming platform 120 may generate JavaScript code for animating graphical objects in accordance with the animation element 128(1). In addition, the declarative programming platform 120 may store the application code and configuration information in the data model module 122.

In some embodiments, the markup code 132(1) may be markup-based image format code. For instance, the markup code 132(1) may be inline scalable vector graphics (SVG) code. Further, employing inline markup code may provide security and performance benefits. For instance, use of inline markup may overcome web security restrictions that limit or block access to markup code in other application files. Further, use of inline markup may provide speed benefits over systems that require data requests to obtain SVG code from other files and/or locations.

For example, the declarative programming platform 120 may generate the markup code 132(1) to include elements, attributes, and properties of SVG. As used herein, an "element" may refer to a markup component. Some examples of elements include "a", "rect", "title", "animate", "animateMotion", "animateTransform", and "circle". As used herein, an "attribute" may refer to a modifier of an element. An attribute may modify the default functionality of an element type or provide functionality to certain element types. Some examples of attributes include "height", "width", "rx", "href", and "id".

In addition, one or more elements, attributes, or attribute values within the markup code 132(1) may be a parameter (i.e., variable) to be dynamically set using the animation information 130(1). For example, the markup code 132(1) may include a "rect" element with a height attribute set to a first parameter and a width attribute set to a second parameter based on the animation element 128(1). Further, the animation information 130(1) may include a first attribute value corresponding to the first parameter that sets the height of a rectangle employed with respect to the animation element 128(1), and a second attribute value corresponding to the second parameter that sets the width of a rectangle employed with respect to the animation element 128(1).

Further, the data model module 122 may store customer information associated with the customers 106(1)-(N) or the customer devices 104(1)-(N), and client information associated with the clients 110(1)-(N) or the client devices 108(1)-(N). Some examples of customer information and client information include security information, security permissions, usage information, configuration preferences, financial information, location information, customer management information, etc.

In some embodiments, the data model module 122 may be a multi-tenant database. As used herein, the term "multi-tenant database" refers to those database systems in which various elements of hardware and software of the database system may be shared by a plurality of entities, e.g., one or more customers 106. As used herein, the term "database" refers to an organized collection of data. Some examples of databases include columnar databases, relational databases, key-store databases, graph databases, and document stores.

As illustrated in FIG. 1, the data model module 122 may be an organized collection of records 134(1)-(N) each having a relationship with a web application 114. Further, in some embodiments, each record 134 may have a corresponding record identifier 136. For example, the record identifier 136(1) may identify the record 134(1), the record identifier 136(2) may identify the record 134(2), the record identifier 136(N) may identify the record 134(N), and so forth. Further, an individual record identifier 136 may uniquely identify its corresponding record 134 within the multi-tenant system 100.

As used herein, and in some embodiments, a "record" may refer to a data entity, such as an instance of a data object created by a customer 106 of the multi-tenant service 102. In some embodiments, a data object may be a standard object having a data structure defined by the multi-tenant service 102, or a custom data object having a data structure defined by a customer 106. Further, the data structure of a data object may define data fields of the record. Each data field may have a data type indicating the type of information the data field stores.

In some embodiments, a data object may correspond to a database table of a database system, a data field of the database object may correspond to a column of the database table, and a record may correspond to a row of the database table. Some example data types include alphanumeric string, integer, decimal, floating point, date, time, binary value, Boolean, identifier, relationship, checkbox, formula, address, currency, enumerated combination box, email address, encrypted string, location, percent, phone number, reference, text area, uniform resource locator, enumeration, etc.

The API 124 may be configured to manage the data model module 122. For instance, the API 124 may be configured to create, retrieve, update or delete the records 134(1)-(N). In some embodiments, the API may include a Simple Object Access Protocol (SOAP) API, a REpresentational State Transfer (REST) API, or any other type of protocol that may be employed for sending requests to the data model module 122.

Further, the declarative programming platform 120, the web applications 114, and the front-end components 118(1)-(N) may manage the data of the data model module 122 via the API 124. For instance, when configuring the web application 114(1) to present a celebration animation upon completion of a path step of a path component 131, the declarative programming platform 120 may use the API 122 to create records 134(1) storing information corresponding to the path component 131, the path stage, or the celebration animation. As an example, the declarative programming platform 120 may use the API 122 to create the record 134(1) to store the animation information 130(1) in the data model module 122.

In some embodiments, the front-end applications 118(1)-(N) may be configured to receive requests from the client components 116(1)-(N), and provide responses to the client components 116(1)-(N). Further, the customers 106(1)-(N) may develop and manage the front-end applications 118(1)-(N) and the client components 116(1)-(N) via the administrator interfaces 138(1)-(N) of the customer devices 104(1)-(N). The administrator interfaces 138(1)-(N) may be web applications that provide access to the declarative programming platform 120. For instance, the administrator interfaces 138(1)-(N) may present point and click, drag and drop interfaces, configuration wizards, and/or declarative language input for developing the web applications 114(1)-(N) associated with the declarative programming platform 120.

As an example, the administrator interface 138(1) may present the configuration wizard for adding the path component 131 to the web application 114(1). The customer 106(1) may provide user input to the configuration wizard instructing the declarative programming platform 120 to add the path component 131 to the web application 114(1). Further, the customer 106(1) may provide user input to the configuration wizard requesting that the declarative programming platform 120 configure the web application 114(1) to display a celebration animation with particular dynamic attributes upon completion of a path stage of the path component 131. In some embodiments, the customer 106(1) may select the type of animation to present upon completion of the path stage via the addition of the animation element 128(1).

In response, the declarative programming platform 120 may generate application code or configuration information associated with the path component 131 within the front-end component 118(1) and the client component 116(1). For example, the declarative programming platform 120 may add an animation manager 140(1) to the client component 116(1), and configure the client component 116(1) to present the path component 131 within a graphical user interface of the client component 116(1).

Additionally, the declarative programming platform 120 may generate the markup code 132(1) within the application code or configuration code based upon the animation element 128(1) selected by the customer 106(1). The markup code 132(1) may include markup elements and attributes defining configurable aspects of the animation corresponding to the animation element 128(1). As an example, the celebration animation may be a confetti animation that presents digital graphics simulating balloons and confetti moving according to a pattern. Further, some of the elements or attributes may be parameters that are dynamically set by the animation manager 140(1) when the application code is executed as the client component 116(1).

As an example, the markup code 132(1) may include parameters corresponding to one or more colors of the confetti and balloons within the confetti animation, the opacity of the confetti and balloons within the confetti animation, or one or more fonts employed within the confetti animation. Further, the animation manager 140(1) may employ the animation information 130(1) associated with the web application 114(1) to set the parameters within the markup code 132(1). For instance, the animation information 130(1) may indicate that client application 116(1) should present the confetti and balloons with red and white colors within the confetti animation, and the animation manager 140(1) may set the parameters within the markup code 132(1) to red and white based on the animation information 130(1).

Given the dynamic functionality of the animation manager 140(1), the animation information 130(1) may be set and/or updated independently of the development of the web application 114(1). For instance, the customer 106(1) may update the animation information 130(1) while the web application 114(1) is in production, and alter the celebration animation as presented during subsequent execution. In some embodiments, the customer 106(1) may employ the administrator interface 138(1) to update the animation information 130(1) of the web application 114(1) in a post-development phase. In some instances, the administrator interface 138(1) may create, modify, and delete the animation information 130(1). For example, the administrator interface 138(1) may update a color scheme applied to the balloons and confetti presented within the celebration animation of the web application 114(1).

The declarative programming platform 120 may store the animation information 130(1) corresponding to the attributes of the celebration animation within the records 134(1)-(N) of the data model module 122. In some embodiments, the markup code 132 for an animation element 128(1) included in multiple web applications 114 may be identical or nearly-identical, and the values provided by the individual customers 106 within the animation information 130(1)-(N) for the parameters within the markup code 132 are used to customize animations within the web applications 114.

As described above, the animation managers 140(1)-(N) may be configured to set the parameters of the markup code 132(1)-(N) using data stored within the records 134(1)-(N). As such, the animation manager 140(1) may request data stored within the data model module 122. For instance, the declarative programming platform 120 may configure the animation manager 140(1) to send the animation information request 142(1) to the front-end component 118 to obtain the animation information 130(1), and dynamically set the parameters within the markup code 132(1) using the animation information 130(1). As an example, the animation manager 140(1) may receive the animation information 130(1) including a mapping of an identifier of a confetti object to the color red. Additionally, the declarative programming platform 120 may set the value of the color attribute of the confetti within an element of the markup code 132(1) to the red based on the animation information 130(1). Once the animation manager 140(1) has set the parameters within the markup code 132(1), the animation manager 140(1) may generate a red confetti object as an animation confetti object 144(1) based on the appearance attributes defined in the markup code 132(1).

In some embodiments, each client component 116 may include an application data service 146 for locally managing the records 134 associated with the client component 116. For instance, the application data service 146(1) may be used by the path component 131 to load, create, edit, or delete the records (e.g., 134(1)-(2)) associated with the client component 116(1). In some examples, the path component 131 may request the records 134(1)-(2) from the application data service 146(1) during execution of the web application 114(1).

As illustrated in FIG. 1, the client devices 108(1)-(N) may include web browsers 148(1)-(N). A "web browser," as referred to herein, may relate to a software application or a software application component for retrieving, rendering, and presenting information resources from the World Wide Web and/or other sources. Web browsers enable users to access and view documents and other resources located on remote servers, e.g., the multi-tenant service 102.

For example, the web browser 148(1) may retrieve portions of the web application 114(1) (e.g., the client component 116(1)) and any associated media and/or files) from the multi-tenant service 102 using a HTTP connection via the communication network 112, render the client component 116(1), and present the rendered client component 116(1) to the client 110(1) via the client device 108(1). Some examples of web browser applications include Google Chrome™, Mozilla Firefox™, Microsoft Internet Explorer™, Opera™, and Apple Safari™.

As illustrated in FIG. 1, the client components 116(1)-(N) may include animation managers 140(1)-(N). For example, the client component 116(1) may include the animation manager 140(1), the client component 116(2) may include the animation manager 140(2), the client component 116(N) may include the animation manager 140(N), and so forth. Further, the animation managers 140(1)-(N) may be configured to dynamically configure and manage presentation of customizable animations within the client components 116(1)-(N).

For instance, in response to completion of the path stage of the path component 131, the animation manager 140(1) may send the animation information request 142(1) to the API 124 and receive the animation information 130(1) from the API 124(1). In some embodiments, the animation information request 142(1) may include a record identifier 136(1) of a record 134(1) associated with the declarative component 126(1) and the animation information 130(1) of the web application 114(1). Additionally, or alternatively, the animation information request 142(1) may include any other identifier capable of identifying the animation information 130(1) corresponding to completion of the path stage, the path stage, the path component 131, the animation element 128(1), or the web application 114(1).

Further, the animation manager 140(1) may configure the markup code 132(1) based on the animation information 130(1), and generate animation objects 144 for implementing the animation based on the markup code 132(1). For example, the animation manager 140(1) may set the parameters within the markup code 132(1) to the values within the animation information 130(1), and generate animation objects 144(1)-(N) based on the updated markup code 132(1). As an example, the animation manager 140(1) may determine that the animation is a celebration animation that includes a confetti object based on the animation element 128(1) or the animation information 130(1). Further, the animation manager 140(1) may determine the attributes of the confetti object based on the updated markup code 132(1), and create the confetti object 144(1) using a constructor class or function that receives information for creating the confetti object from the updated markup code 132(1). For example, a value from the markup code 132(1) may be input as a parameter to the constructor class.

Once the animation objects (e.g., the confetti object 144(1)) have been dynamically generated, an animation component 150(1) may present the animation using the animation objects. In some embodiments, the animation component 150(1) may be built using HTML, CSS, and JavaScript. For example, the animation component 150(1) may utilize CSS Animations and an animation loop based on the requestAnimationFrame method. Further, in some instances, building the animation component 150(1) may not require use of a third-party library.

In some embodiments, the declarative programming platform 120 may add the animation component 150(1) to the web application 114(1). In some other embodiments, the declarative programming platform 120 may configure the animation manager 140(1) to dynamically render the animation component 150(1) based on an event (e.g., completion of a path step), for example as described in co-pending U.S. patent application Ser. No. 16/670,891 by Ali et al., entitled "CUSTOMIZABLE ANIMATIONS" filed on Oct. 31, 2019, which is incorporated by reference herein in its entirety. Further, the animation manager 140(1) may call a method on the animation component 150(1) that causes the animation to be displayed using the animation objects (e.g., the confetti object 144).

In some instances, the front-end component 118(1) may obtain the animation information 130(1) from the data model module 122 via the API 124, and send the animation information 130(1) to the animation manager 140(1) via the communication network 112. In some embodiments, the animation information 130(1) may include the records 134(1) associated with the animation element 128(1). In some other embodiments, the animation information 130(1) may include data from the records 134(1) associated with the celebration animation. For example, the animation information 130(1) may include at least the type of the animation, and the values for the parameters of the markup code 132 of the web application 114(1).

Figure 2A:
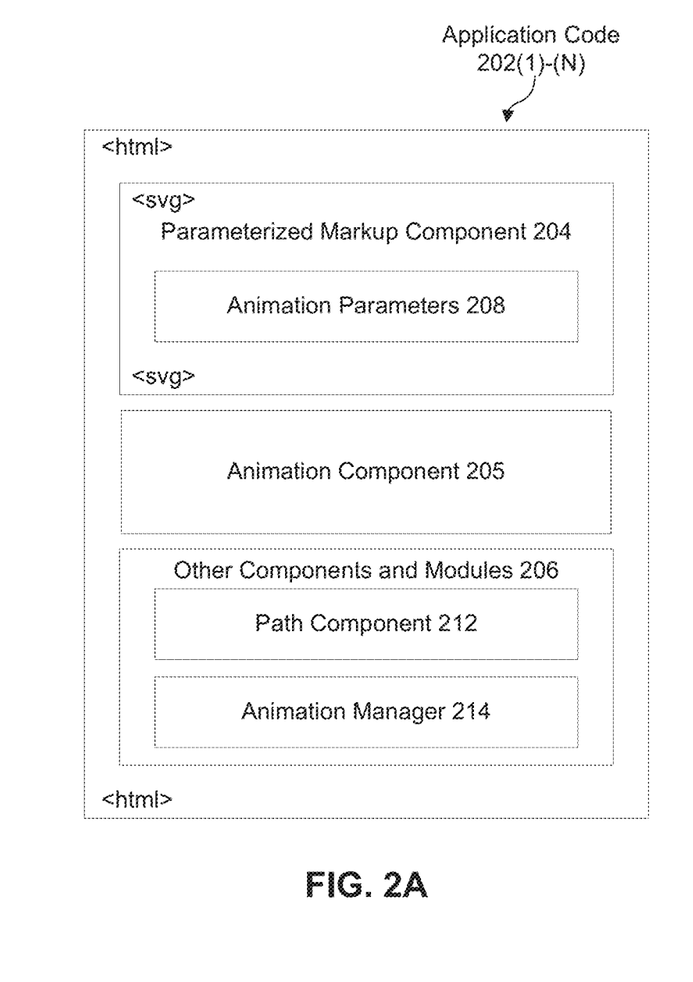
FIG. 2A-2B are diagrams of application code for implementing a customizable animation experience in a multi-tenant system, according to some embodiments.
Figure 2B:
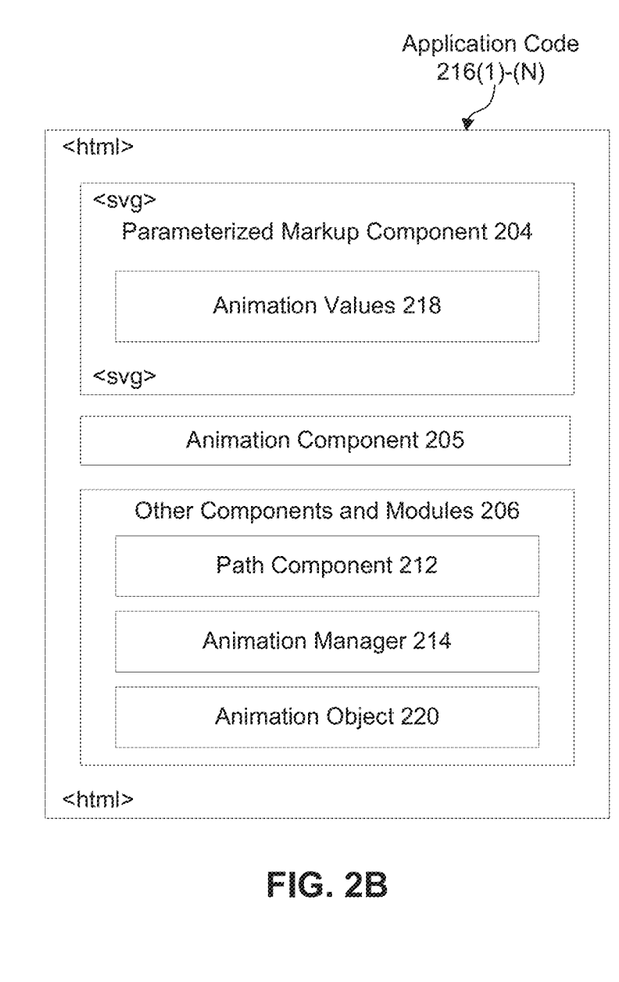

FIG. 2A-2B are diagrams of application code for implementing a customizable animation experience in a multi-tenant system, according to some embodiments. As illustrated in FIG. 2A, the application code 202 for a web application (e.g., the web application 114(1)) may be an HTML file including a parameterized markup component 204. In some instance, a declarative programming platform 120 may generate the application code 202 to include the parameterized markup component 204 and an animation component 205. In some other embodiments, the animation component 205 may be dynamically rendered during execution of the application code 202. As described herein, the parameterized markup component 204 may be an inline markup portion of the application code 202 with parameters 208 for the elements, attributes, and properties. In some embodiments, the parameterized markup component 204 may be SVG markup. Further, the application code 202 may include other components and modules, e.g., a path component 212 and an animation manager 214.

As described herein, the path component 212 may be associated with an animation. For example, the web application may present the animation in response to completion of a path step of the path component 212 by a user. Further, the animation manager 214 may dynamically configure the animation based on animation information (e.g., the animation information 130) received from a multi-tenant service provider (e.g., the multi-tenant service 102). As described in detail herein with respect to FIG. 1, the animation information may be specific to the implementation of the animation within the web application corresponding to the application code 202, and provide application-specific configuration of the animation.

As described herein, the animation manager 214 may retrieve the animation information from a multi-tenant service provider. Further, as illustrated in FIG. 2B, the animation manager 214 may replace the animation parameters 208 with the animation values 218 set forth in the animation information to generate the application code 216. In addition, the animation manager 214 may generate the animation object 220 based on the updated parameter markup component 204 including the animation values 218. Further, the animation component 205 may present the animation object 220 within the animation corresponding to the animation component 206.

Figure 3:
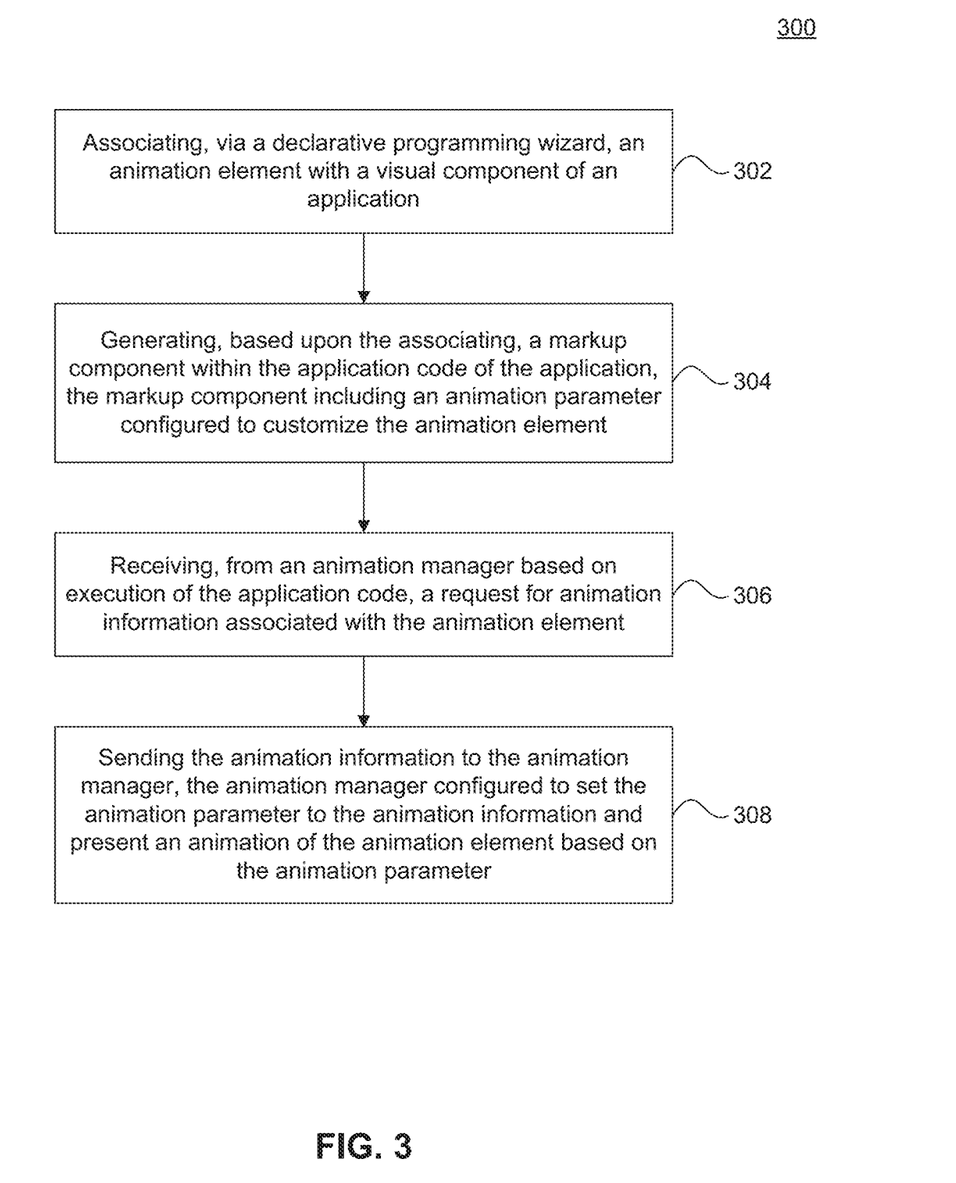
FIG. 3 illustrates an example method for implementing a customizable animation experience, according to some embodiments.

FIG. 3 illustrates a method 300 for implementing dynamic customizable animations in a multi-tenant system, according to some embodiments, according to some embodiments. Method 300 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

At 302, a multi-tenant service may associate, via a declarative programming wizard, an animation element with a visual component of an application. For example, the declarative programming platform 120 may receive instruction from a configuration wizard of the administrator interface 138(1) to add the path component 131 to the web application 114(1) and the animation element 128(1) for a confetti animation to the web application 114(1). Further, the declarative programing platform 120 may receive an instruction from the configuration wizard to display the confetti animation associated with the animation element 128(1) in response to completion of a path stage of the path component 131 within the web application 114(1).

At 304, the multi-tenant service may generate, based upon the association, a markup component within the application code of the application, the markup component including an animation parameter configured to customize the animation element. For example, the declarative programming platform 120 may generate inline SVG code (e.g., the markup code 132(1)) within the application code of the web application 114(1). Further, the inline SVG code may include an attribute set to a parameter value. As an example, a color attribute of an element within the inline SVG code may be set to a variable instead of an enumerated color or HTML color code. In some embodiments, the declarative programming platform 120 may further generate the animation manager 140(1) in the application code. The animation manager 140(1) may be configured to dynamically assign the parameter based on the animation information 130(1).

At 306, the multi-tenant service may receive, from an animation manager based on execution of the application code, a request for animation information associated with the animation element. For example, the front-end component 118(1) may receive the animation information request 142(1) from the animation manager 140(1). In some embodiments, the animation information request 142(1) may include the record identifier 136(1). Further, the record identifier 136(1) may identify the record 134(1) storing data corresponding to the animation information 130(1), and/or the web application 114(1).

At 308, the multi-tenant service may send the animation information to the animation manager, the animation manager configured to set the animation parameter to the animation information and present an animation of the animation element based on the animation parameter. For example, the front-end component 118(1) may send the animation information 30(1) in response to the animation information request 142(1) received from the client component 116(1). In some embodiments, the front-end component 118(1) may retrieve the record 134(1) including the animation information 130(1) via the API 122 using an identifier (e.g., the record identifier 136(1)) included in the animation information request 142(1).

Upon receipt of the animation information 130(1), the animation manager 140(1) may replace the animation parameters within the markup code 132 with the animation values of the animation information 130(1). Additionally, the animation manager 140(1) may generate the animation objects (e.g., the confetti object 144) based on the updated markup code 132(1). For instance, the animation manager 140(1) may determine the attributes of the confetti object based on the updated markup code 132(1) and create the confetti object 144(1) using a constructor class or function. Further, the animation manager 140(1) may call a method on the animation component 150(1) that causes the animation to be displayed using the confetti object 144.

Figure 4:
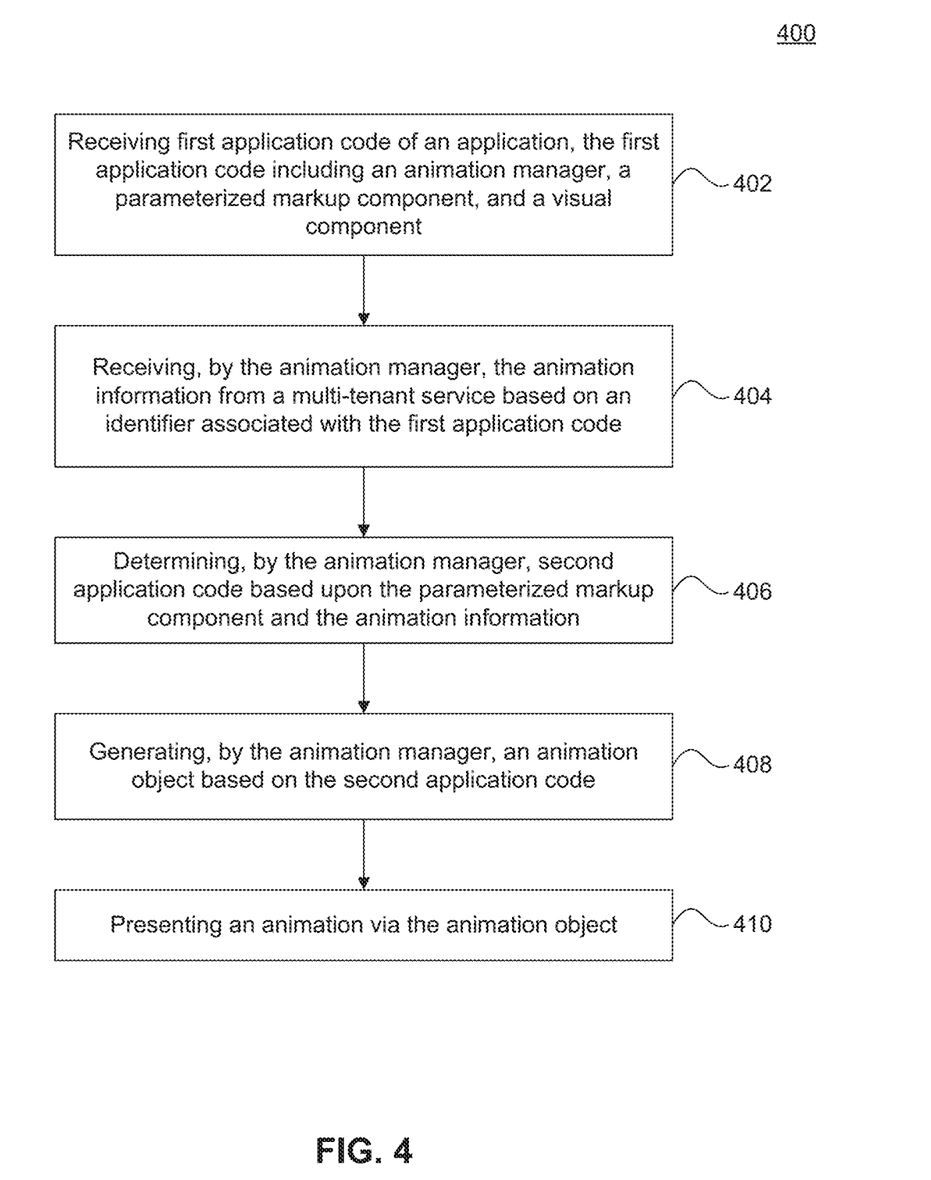
FIG. 4 illustrates an example method for implementing a customizable animation experience, according to some embodiments.

FIG. 4 illustrates a method 400 for implementing dynamic customizable animations in a multi-tenant system, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

At 402, the client device receives first application code of an application, the first application code including an animation manager, a parameterized markup component, and a visual component. For example, the client device 108(1) may receive the client component 116(1) from the multi-tenant service 102 via the communication network 112. As described in detail above, the client component 116(1) may be associated with the web application 114(1) operated by the customer 106(1) of the multi-tenant service 102. Further, the client component 116(1) may include the path component 131, the animation manager 140(1), the animation element 128(1), and the markup code 132(1).

At 404, the client device receives, via the animation manager, the animation information from a multi-tenant service based on an application identifier associated with the first application code. For example, the path component 131 and animation manager 140(1) may be configured to display a confetti animation in response to user input associated with the path component 131, e.g., receipt of user input at a path stage of the path component 131. In response to the user input, the animation manager 140(1) may send the front-end component 118 an animation information request 142(1) including the record identifier 136(1) identifying the record 134(1) storing data corresponding to the animation information 130(1). Further, the front-end component 118(1) may send the animation information 130(1) to the animation manager 140(1) in response to the animation information request 142(1).

At 406, the client device determines, by the animation manager, second application code based upon the parameterized markup component and the animation information. For example, the animation manager 140(1) may update the markup code 132(1) based on the animation information 130(1) by replacing a color parameter within the markup code 132(1) with a color value within the animation information 130(1).

At 408, the client device generates, by the animation manager, an animation object based on the second application code. For example, the animation manager 140(1) may generate a red confetti object 144(1) as an animation object 144(1) based on the appearance attributes defined in the updated markup code 132(1).

At 410, the client device presents an animation using the animation object. For example, the animation manager 140(1) may cause the animation component 150(1) to display the confetti animation using the confetti object 144(1). In some instances, the animation component 150(1) may employ a requestAnimationFrame call to present the animation. Further, the animation may include presenting confetti or balloons in a graphical user interface of the client component 116(1).

In some embodiments, the animation manager 140(1) may modify the celebration animation displayed by the animation component 150(1) based on the browser settings associated with the web browser 148(1). For instance, the browser settings may modify one or more colors of the animation objects (e.g., animation object 144(1)) within the confetti animation based on browser accessibility settings.

Figure 5:
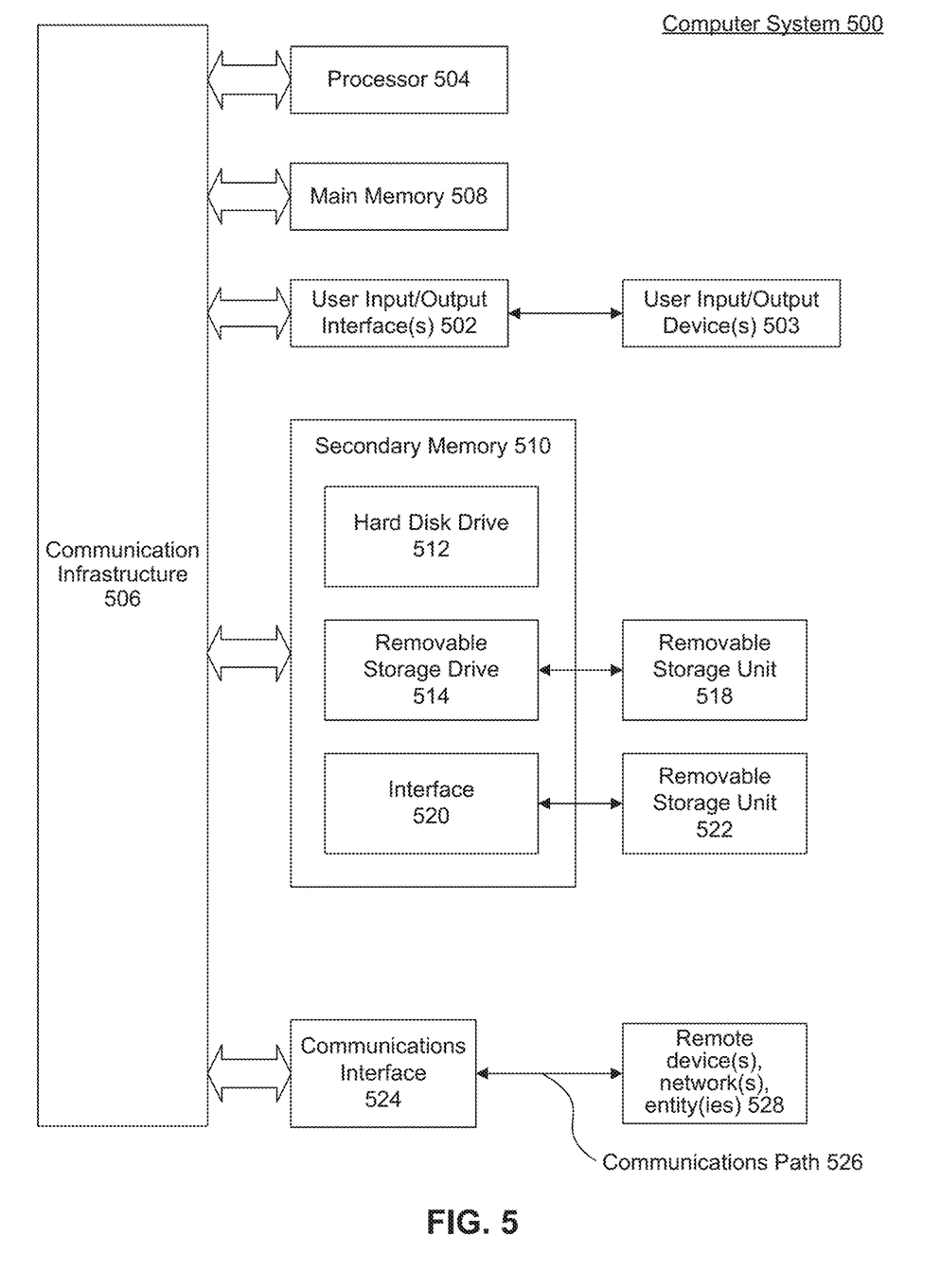
FIG. 5 illustrates a computer system, according to exemplary embodiments of the present disclosure.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure or bus 506 through user input/output device(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
generating a markup component within application code of an application, the markup component including an animation parameter configured to customize an animation element;
receiving, from a animation manager based on execution of the application code, a request for animation information associated with the animation element and an identifier associated with the application code; and
sending, to the animation manager, the animation information from a record corresponding to the identifier associated with the application code, the animation manager configured to set the animation parameter to the animation information and display a first animation associated with the animation element according to the set animation parameter and based on completion of a path stage of a visual component of the application that includes a second animation for the application, wherein the first animation for the application is independent from the second animation.

2. The method of claim 1, wherein the animation parameter within the application code is set to a value within the animation information.

3. The method of claim 1, wherein the animation parameter corresponds to an appearance attribute of a graphical object displayed within the animation.

4. The method of claim 1, further comprising:
receiving the animation information from a client device via a declarative programming wizard; and
associating the animation information with an identifier corresponding to the application.

5. The method of claim 1, wherein the markup component is an inline scalable vector graphics markup.

6. The method of claim 1, wherein the record corresponding to the identifier associated with the application code is stored in a multi-tenant service associated with a tenant corresponding to the application based on the identifier.

7. The method of claim 1, wherein the path stage comprises a plurality of path stage components and the animation is presented at each completion of two or more path stage components of the plurality of path stage components.

8. A system comprising:
a memory; and
a processor coupled to the memory and configured to perform operations comprising:
generating a markup component within application code of an application, the markup component including an animation parameter configured to customize an animation element;
receiving from an animation manager based on execution of the application code, a request for animation information associated with the animation element and an identifier associated with the application code; and
sending, to the animation manager, the animation information from a record corresponding to the identifier associated with the application code, the animation manager configured to set the animation parameter to the animation information and display a first animation associated with the animation element according to the set animation parameter and based on completion of a path stage of a visual component of the application that includes a second animation for the application, wherein the first animation for the application is independent from the second animation.

9. The system of claim 8, wherein the animation parameter within the application code is set to a value within the animation information.

10. The system of claim 8, wherein the animation parameter corresponds to an appearance attribute of a graphical object displayed within the animation.

11. The system of claim 8, wherein the operations further comprise:
receiving the animation information from a client device via a declarative programming wizard; and
associating the animation information with an application identifier corresponding to the application.

12. The system of claim 8, wherein the record corresponding to the identifier associated with the application code is stored in a multi-tenant service associated with a tenant corresponding to the application based on the identifier.

13. A non-transitory computer-readable medium having instructions stored thereon that, when executed by at least one computing device, cause the at least one computing device to perform operations comprising:
generating a markup component within application code of an application, the markup component including an animation parameter configured to customize an animation element;
receiving, from an animation manager based on execution of the application code, a request for animation information associated with the animation element and an identifier associated with the application code; and
sending, to the animation manager, the animation information from a record corresponding to the identifier associated with the application code, the animation manager configured to set the animation parameter to the animation information and display a first animation associated with the animation element according to the set animation parameter and based on completion of a path stage of a visual component of the application that includes a second animation for the application, wherein the first animation for the application is independent from the second animation.

14. The non-transitory computer-readable medium of claim 13, wherein the animation parameter within the application code is set to a value within the animation information.

15. The non-transitory computer-readable medium of claim 13, wherein the animation parameter corresponds to an appearance attribute of a graphical object displayed within the animation.

16. The non-transitory computer-readable medium of claim 13, the operations further comprising:
receiving the animation information from a client device via a declarative programming wizard; and
associating the animation information with an identifier corresponding to the application.

17. The non-transitory computer-readable medium of claim 13, wherein the markup component is an inline scalable vector graphics markup.

* * * * *

UNITED STATES PATENT AND TRADEMARK OFFICE
CERTIFICATE OF CORRECTION

PATENT NO. : 11,704,855 B2
APPLICATION NO. : 16/749662
DATED : July 18, 2023
INVENTOR(S) : Ramamurthy et al.

It is certified that error appears in the above-identified patent and that said Letters Patent is hereby corrected as shown below:

In the Specification

In Column 3, Line 7, delete "YAML Ain't" and insert -- Yet Another --, therefor.

In Column 14, Line 25, delete "and/any" and insert -- and/or any --, therefor.

In the Claims

In Column 16, Claim 1, Line 32, delete "a" and insert -- an --, therefor.

Signed and Sealed this
Twenty-ninth Day of August, 2023

*Katherine Kelly Vidal*

Katherine Kelly Vidal
*Director of the United States Patent and Trademark Office*